Oct. 25, 1949.　　　C. A. GUSTAFSON　　　2,485,732
GEAR SHIFT CONTROL
Filed June 3, 1946　　　3 Sheets-Sheet 1
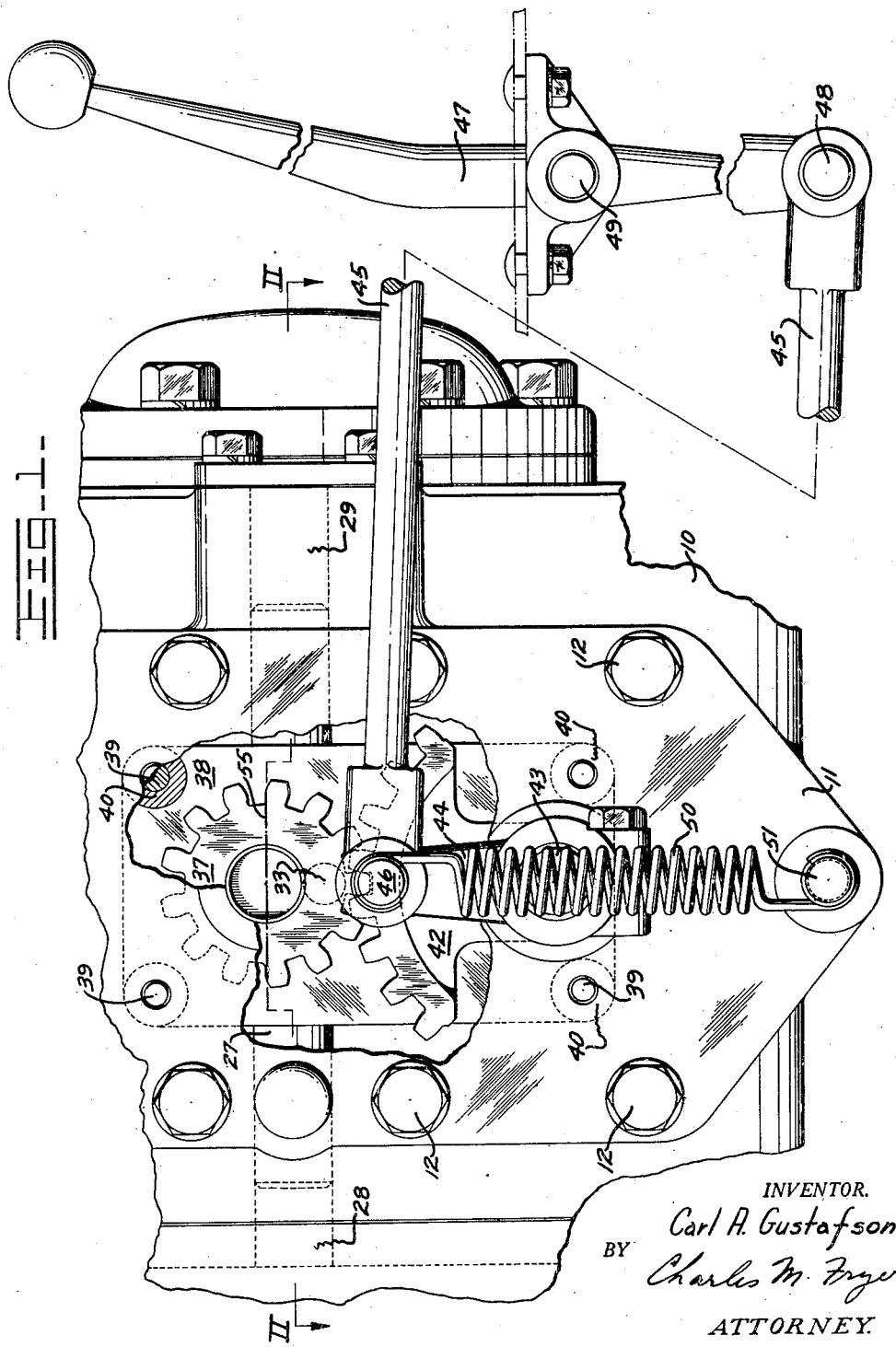
INVENTOR.
Carl A. Gustafson
BY Charles M. Fryer
ATTORNEY.

Oct. 25, 1949.  C. A. GUSTAFSON  2,485,732
GEAR SHIFT CONTROL
Filed June 3, 1946  3 Sheets-Sheet 2
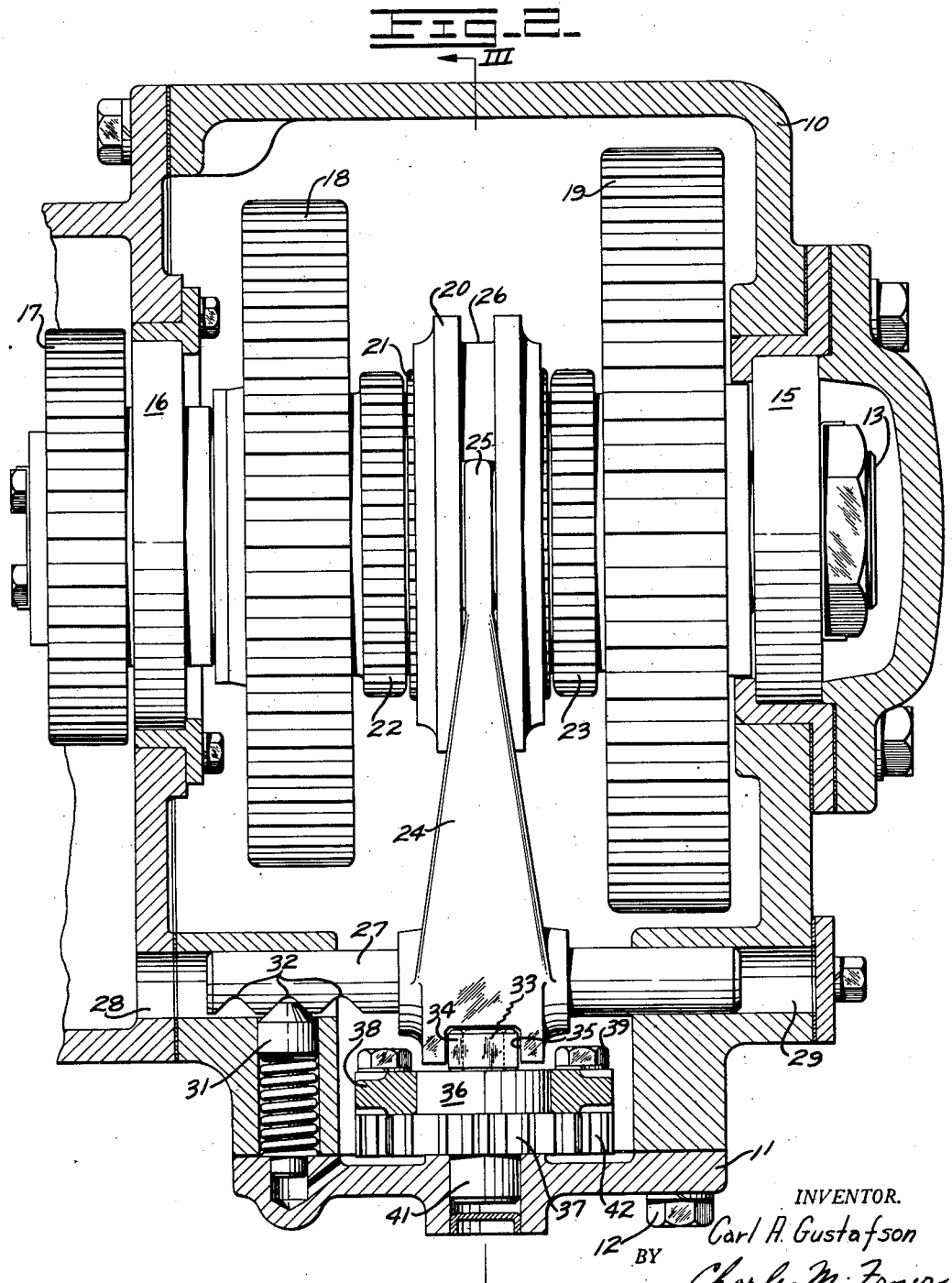
INVENTOR.
Carl A. Gustafson
BY Charles M. Fryer
ATTORNEY.

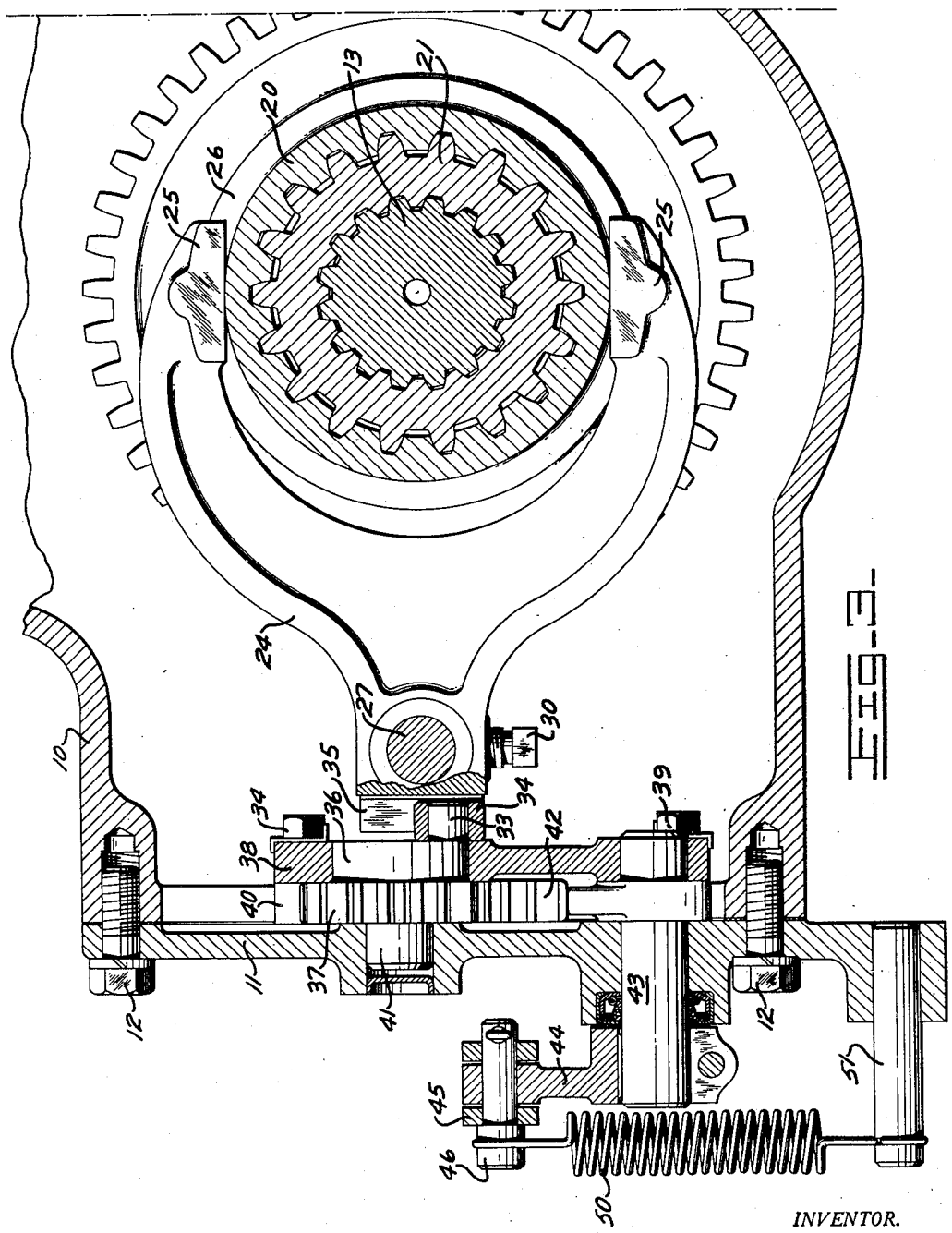

Patented Oct. 25, 1949

2,485,732

UNITED STATES PATENT OFFICE 2,485,732

GEARSHIFT CONTROL

Carl A. Gustafson, Peoria, Ill., assignor to Caterpillar Tractor Co., San Leandro, Calif., a corporation of California Application June 3, 1946, Serial No. 674,024

3 Claims. (Cl. 74—473)

This invention relates to gear shift controls and particularly to controls for a gear type transmission.

Conventional gear transmissions include the kind in which constantly meshed pairs of gears of different driving ratios are selectively brought into use by a shiftable member operable to establish a driving relationship between the gears and a shaft. A commonly used shifting member comprises an internally splined coupling, slideable on an externally splined part of the shaft and adapted to be engaged selectively with splined members connected one with each of the gears to establish a driving connection between the gear and the shaft. The drive is thus established through a sliding connection which is engaged or disengaged by movement parallel to the axis of the shaft. Vibration resulting from the operation of the gears and other causes frequently results in this driving connection becoming disengaged, a difficulty which is commonly referred to as "slipping out of gear."

It is an object of the present invention to provide an improved and simple form of gear shift control, one of the advantages of which is that it automatically locks the transmission against accidental disengagement or slipping out. The invention has further objects and advantages which will be made apparent in the following specification wherein a preferred form thereof is described by reference to the accompanying drawings.

In the drawings:

Fig. 1 is a fragmentary view in elevation of a gear transmission embodying the present invention and also illustrating a shift lever employed with the transmission;

Fig. 2 is a sectional view taken on the line II—II of Fig. 1; and

Fig. 3 is a sectional view taken on the line III—III of Fig. 2.

The transmission illustrated in the drawings is of the two-speed type embodying two sets of gears of different ratio which may be selectively engaged and disengaged in the customary manner. The present invention is particularly adapted to such a two-speed transmission but may be employed in connection with transmissions having more than two speeds by substantial duplication of some of the mechanism which is herein described for purposes of illustrating the invention as will presently appear.

The transmission illustrated is disposed in a case 10 which has a cover 11 secured in place thereon as by cap screws shown at 12. In Fig. 2 a shaft 13 is shown as supported for rotation between bearings 15 and 16, the construction and mounting of which is conventional. A driving gear 17 is fixed to one end of the shaft 13 for rotation therewith. Transmission gears 18 and 19 are carried on the shaft 13 normally to rotate independently of the shaft and are adapted to be selectively connected to the shaft for rotation therewith by a shifting coupling 20. Each of the gears 18 and 19 forms one of a pair of transmission gears for driving the shaft 13 at different speed ratios. The other gears of these pairs are not herein shown but are constantly in mesh with the gears 18 and 19 as is well understood by those familiar with the art. The shifting collar 20 which is shown in Fig. 2 in its neutral position is an annular internally splined member as appears in Fig. 3 and is connected with the shaft 13 by a gear like externally splined member 21 which has a splined connection with the shaft so that the collar 20 is rotatable with but longitudinally slideable with respect to the shaft 13. Each of the gears 18 and 19 carries an integrally formed gear like splined member 22 and 23 respectively similar in size and axially aligned with the member 21 upon which the collar 20 slides. Thus if the collar 20 is moved to the left as viewed in Fig. 2 it will engage splined member 22 at the same time that it is in engagement with the splined member 21 and operatively connect the gear 18 to the shaft 13 for rotation therewith. Likewise, if the collar 20 is shifted to the right it will, through engagement with the splined member 23, connect the gear 19 with the shaft 13.

Shifting of the collar 20 is accomplished through a shifting fork 24 which, as shown in Figs. 2 and 3, is bifurcated to provide fingers 25 which engage in a groove 26 formed in the periphery of the collar 20. The shifting fork 24 is carried on a shaft 27 which, as shown in Fig. 2, is mounted for reciprocal movement in bearing openings 28 and 29 formed in the transmission case. The fork 24 is rigidly secured to the shaft 27 as by a set screw shown at 30 in Fig. 3. A detent mechanism is preferably provided for locking the shaft 27 in either one of its shift positions or in its neutral position and comprises a spring pressed plunger 31 of conventional design engageable with any one of three suitably spaced notches 32 formed in the shaft.

Shifting action is imparted to the fork 24 according to the present invention by a pin 33 which extends into a block 34 slideable in a guideway 35 formed in the fork. The pin 33 is carried in an eccentric position on a trunnion 36 of a pinion gear 37. The trunnion 36 is journalled for rotation in a suitable bearing opening in a plate 38 which is secured to the cover 11 by cap screws shown at 39. Spacers 40, which are illustrated in Fig. 1, surround the cap screws 39 and are disposed between the cover 11 and plate 38 to maintain these parts in spaced relation to permit rotation of the pinion 37 between them. The pinion 37 is also provided with a trunnion 41 for reception as shown in Fig. 3 in a suitable bearing formed in the cover 11. With the construction described, rotation of the pinion 37 imparts a shifting movement to the fork 24 and the shaft 27 upon which the fork is carried in the direction of the axis of the shaft through the medium of the eccentrically disposed pin 33 which swings through an arc as the pinion is rotated.

To impart rotation to the pinion 37, a gear quadrant 42 is fixed on a shaft 43 which, as best shown in Fig. 3, is also journalled for rotation in aligned bearing openings formed in the cover 11 and the plate 38. The outer end of the shaft 43 extends beyond the outer surface of the cover 11 and has secured to it a lever 44 which is pivotally connected to an operating rod 45 as by a pin 46. The operating rod 45 may extend to one end of a gear shift lever 47, see Fig. 1, being connected to the lower end thereof as by a pin 48. The gear shift lever is conventionally pivoted as at 49 and the upper end thereof is free to be manually manipulated to impart reciprocal motion to the operating rod 45. Such motion affects swinging of the lever 44 and this swinging motion is transmitted through the shaft 43 to the gear quadrant 42. As the gear quadrant meshes with the pinion 37, its swinging motion imparts rotation to the pinion 37 which moves the shifting fork.

A spring 50, see Figs. 1 and 3, may be interposed between the pivot pin 46 and an anchor pin 51, carried by the cover 11 to assert a tension which biases the gear quadrant 42 toward either of its shifted positions or holds it in its neutral position, which is illustrated in Fig. 1, with the assistance of the detent plunger 31 engaging in the central notch 32 as illustrated in Fig. 2. Swinging of the gear quadrant 42 in either direction from the central neutral position shown in Fig. 1 may be limited by any suitable means which in the present case are the spacers 40 between the cover member 11 and the plate 38 with which the quadrant engages. Ordinarily the gear shifting mechanism herein described has no tendency to move from its neutral or central position illustrated and in which it is held by spring 50 and the detent mechanism. However, as the mechanism is shifted to either of its gear engaging positions, the gear shift collar 20 has a tendency due to vibration and other causes to slide off of the splined members 22 or 23 and therefore to affect the undesirable slipping out of gear which the present invention overcomes. The detent mechanism and the spring 50 both tend to hold the shifting mechanism in either of its gear engaging positions, but if they were made sufficiently resistant to the tendency of the shifting mechanism to assume a neutral position they would be so stiff in action that they would also make it undesirably difficult for an operator to move the mechanism to its neutral position by means of the shifting lever 47. The mechanism of this invention positively locks the shifting mechanism against return to neutral position from vibration or other causes but does not interfere with free shifting through the medium of the lever 47. This locking is accomplished by the pin 33 which, when the pinion 37 by which it is carried rotates in either direction, swings to a position, or even slightly beyond the position, where it is intersected by the center line 55 which intersects the axis of the pinion gear 37 as shown in Fig. 1. In this position any tendency of the shaft 27 which carries the shifting fork to move in the direction of its axis is blocked as the pinion gear cannot rotate toward neutral as the result of such force because of the center or beyond center position of the pin 33. Furthermore, the pinion gear 37 cannot rotate away from neutral position because it meshes with the gear quadrant 42 which has come to rest against one of the spacers 40. This locking of the pinion gear does not interfere with its rotation toward neutral in a normal manner by swinging the gear quadrant through the medium of the shift lever 47.

I claim:

1. A gear shift control comprising a reciprocal shifting fork operable to engage different gears by movement in opposite directions, a pinion gear adjacent the fork, an eccentric pin carried by the pinion gear and engageable with the fork to impart shifting movement thereto, a gear quadrant meshing with the pinion gear, manually actuated means for imparting swinging movement to the quadrant for rotating the pinion gear, and spring means engaging and biasing the quadrant toward either of its two extreme positions.

2. A gear shift control comprising a reciprocal shifting fork operable to engage different gears by movement in opposite directions, a pinion gear adjacent the fork, an eccentric pin carried by the pinion gear and engageable with the fork to impart shifting movement thereto, a gear quadrant meshing with the pinion gear, manually actuated means for imparting swinging movement to the quadrant for rotating the pinion gear, means whereby the eccentric pin will assume a substantially dead center position to prevent rotation of the pinion gear by the shifting fork in either of its gear engaging positions, and resilient means biasing the gear quadrant toward either position of gear engagement.

3. A gear shift control comprising a reciprocal shifting fork operable to engage different gears by movement in opposite directions, a pinion gear adjacent the fork, an eccentric pin carried by the pinion gear and engageable directly with the fork to impart shifting movement thereto, a gear quadrant meshing with the pinion gear, and stop means associated with the quadrant for limiting movement of the pinion gear to slightly beyond center positions of the eccentric pin carried thereby.

CARL A. GUSTAFSON.

REFERENCES CITED

The following references are of record in the file of this patent:

UNITED STATES PATENTS

| Number | Name | Date |
| --- | --- | --- |
| 1,028,532 | Boland | June 4, 1912 |
| 2,052,650 | Pearmain | Sept. 1, 1936 |
| 2,106,731 | Gallimore | Feb. 1, 1938 |
| 2,147,694 | Fawick | Feb. 21, 1939 |
| 2,195,270 | Dolza | Mar. 26, 1940 |